United States Patent
Chang

(10) Patent No.: US 11,260,510 B2
(45) Date of Patent: Mar. 1, 2022

(54) TOOL WITH LABEL STRUCTURE

(71) Applicant: Chih-Min Chang, Xiushui Township, Changhua County (TW)

(72) Inventor: Chih-Min Chang, Xiushui Township, Changhua County (TW)

( * ) Notice: Subject to any disclaimer, the term of this patent is extended or adjusted under 35 U.S.C. 154(b) by 7 days.

(21) Appl. No.: 16/861,819

(22) Filed: Apr. 29, 2020

(65) Prior Publication Data
US 2021/0339365 A1  Nov. 4, 2021

(51) Int. Cl.
*B25B 23/16* (2006.01)
*B25B 13/06* (2006.01)
*G09F 3/02* (2006.01)
*G09F 3/10* (2006.01)

(52) U.S. Cl.
CPC .............. *B25B 23/16* (2013.01); *B25B 13/06* (2013.01); *G09F 3/02* (2013.01); *G09F 3/10* (2013.01); *B32B 2307/408* (2013.01); *G09F 2003/0208* (2013.01)

(58) Field of Classification Search
None
See application file for complete search history.

(56) References Cited

U.S. PATENT DOCUMENTS

| | | | | |
|---|---|---|---|---|
| 4,836,059 | A * | 6/1989 | Arnold | B25B 13/06 76/114 |
| 5,697,166 | A * | 12/1997 | Hommel | B25B 13/12 33/758 |
| 6,761,093 | B2 * | 7/2004 | Chang | B25B 13/06 81/121.1 |
| 7,028,588 | B2 * | 4/2006 | Shih | B25B 13/56 81/119 |

OTHER PUBLICATIONS

Chrome Socket Labels by Steellabels (http://steellabels.com/product/chrome-socket-labels-original-edition/, via Internet Wayback Machine Apr. 22, 2016 (Year: 2016).*

* cited by examiner

*Primary Examiner* — Laura C Powers
(74) *Attorney, Agent, or Firm* — Muncy, Geissler, Olds & Lowe, P.C.

(57) ABSTRACT

A tool of the present invention includes a tool main body and a matte silver polyester label. The outer surface of the tool main body has a label region. The matte silver polyester label has an indicate surface and a glue surface opposite to the indicate surface. The indicate surface has one or more identification marks represented by words, colors, numbers, patterns or figures. The glue surface is stuck in the label region of the tool main body. As a result, the tool of the present invention provides great identification effect.

4 Claims, 5 Drawing Sheets

TOOL WITH LABEL STRUCTURE

BACKGROUND OF THE INVENTION

1. Field of the Invention

The present invention relates to tools and more particularly, to a tool with a label structure.

2. Description of the Related Art

In order to be adapted for bolts or nuts of different specifications and sizes, the conventional tools, such as sockets or wrenches, are correspondingly designed with different sizes and specifications. Besides, in order to prevent the user from confusion by tools of similar sizes, the tools are provided on the surfaces thereof with identification marks to indicate specifications, sizes or trademarks to facilitate access.

There are many different traditional ways to form the aforementioned identification marks. For example, the identification marks of different colors are formed on the surfaces of the tools by printing, that can raise the identification effect by the contrast and variation between different colors. However, the identification marks are liable to have the abrasion and peeling problems after a long-term use. Alternatively, a recessed identification mark is formed on the surface of the tool by impressing, but it needs secondary processing, thereby making the manufacturing process relatively more complicated.

SUMMARY OF THE INVENTION

It is a primary objective of the present invention to provide a tool which is manufactured easily and has great identification effect.

To attain the above primary objective, the tool of the present invention includes a tool main body and a matte silver polyester label. The outer surface of the tool main body has a label region. The matte silver polyester label has an indicate surface and a glue surface opposite to the indicate surface. The indicate surface of the matte silver polyester label has an identification mark. The glue surface of the matte silver polyester label is stuck in the label region of the tool main body.

It can be known from the above description that the manufacturing process of the tool of the present invention is very simple. Besides, the matte silver polyester label has features of waterproofing, grease proofing, scratch resistance, heat resistance and rip resistance, so it keeps great identification effect after a long-term use, thereby attaining the objective of improved usage convenience.

Preferably, the tool main body is a wrench having a handle portion; the label region is provided on the outer surface of the handle portion; the extending direction of the label region is parallel to the longitudinal direction of the handle portion so that the label region provides a large area for label. Besides, the label region is recessed from the outer surface of the handle portion in the thickness direction of the handle portion, and the indicate surface of the matte silver polyester label is flush in elevation with the outer surface of the handle portion, so that the matte silver polyester label is prevented from protruding out of the outer surface of the handle portion to affect the operational feel.

Preferably, the tool main body is a socket having a socket hole; the label region surrounds the outer surface of the tool main body with the socket hole as the center, so that the label region provides a large area for label. Besides, the label region is recessed from the outer surface of the tool main body in the radial direction of the socket hole, and the indicate surface of the matte silver polyester label is flush in elevation with the outer surface of the tool main body so that the matte silver polyester label is prevented from protruding out of the outer surface of the tool main body to affect the operational feel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
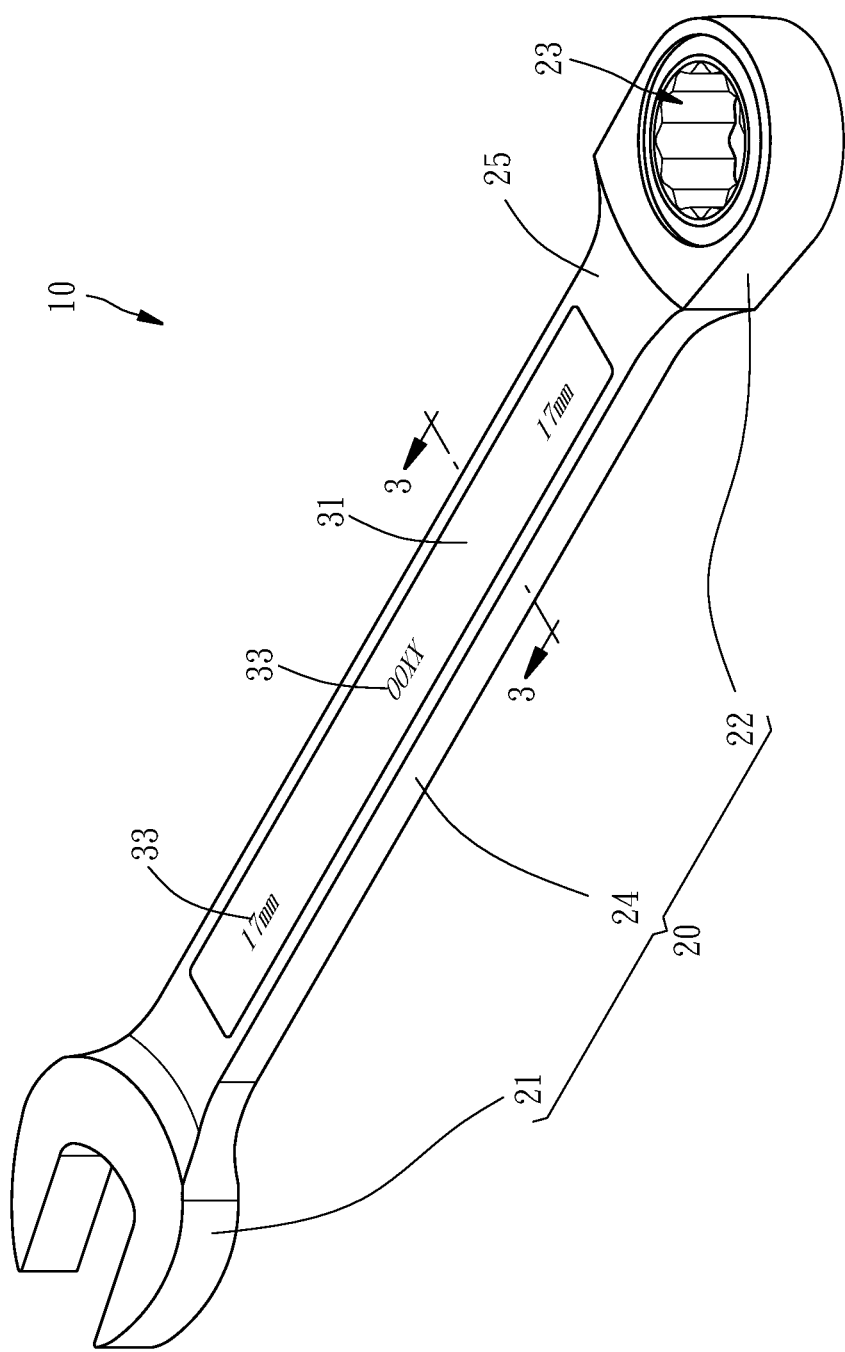
FIG. 1 is a perspective view of a tool of a first embodiment of the present invention.

First of all, it is to be mentioned that throughout this specification, including the following embodiments and claims, the directional terms are all based on the direction shown in the figures. Besides, same reference numerals used in the following embodiments and the appendix drawings designate same or similar elements or the structural features thereof.

Figure 2:
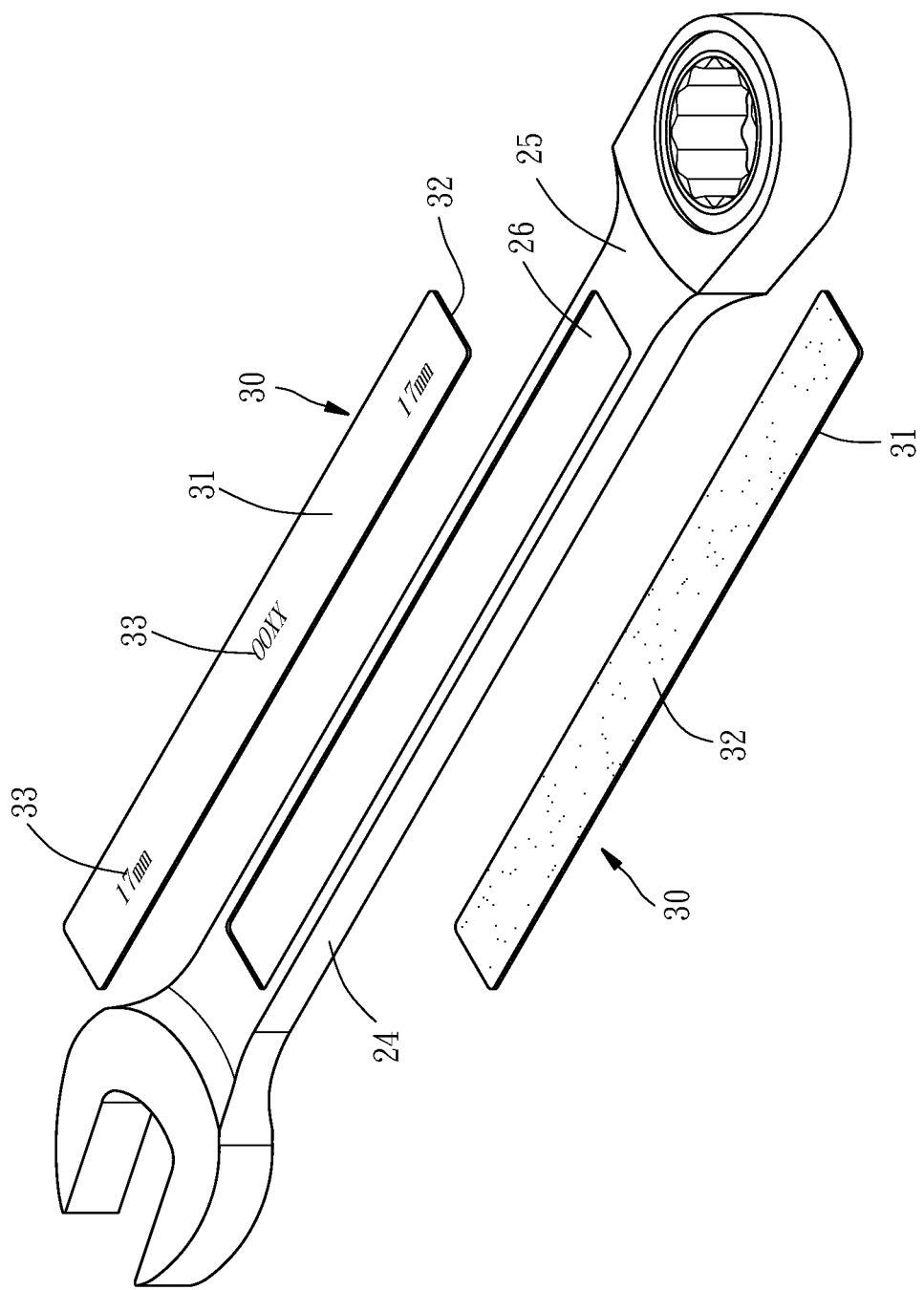
FIG. 2 is an exploded perspective view of the tool of the first embodiment of the present invention.

Referring to FIGS. 1 and 2, a tool 10 of a first embodiment of the present invention includes a tool main body 20 and two matte silver polyester labels 30. In practice, the tool may include at least one matte silver polyester label.

Figure 3:
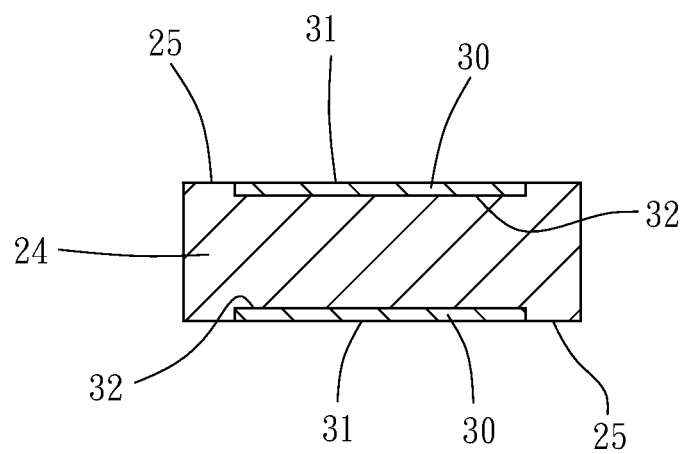
FIG. 3 is a sectional view taken along the line 3-3 in FIG. 1.

The tool main body 20 in this embodiment is a wrench. An end of the tool main body has a first working portion 21 for removing nuts or bolts. The other end of the tool main body has a second working portion 22 for the installation of a ratchet 23. The tool main body 20 further has a handle portion 24 connecting the first working portion 21 and the second working portion 22. Each of the top and bottom outer surfaces 25 of the handle portion 24 has a rectangular label region 26. The extending direction of the label region 26 is parallel to the longitudinal direction of the handle portion 24, and the label region 26 is recessed from the outer surface 25 of the handle portion 24 in the thickness direction of the handle portion 24, as shown in FIG. 3.

The matte silver polyester label 30 has an indicate surface 31 and a glue surface 32 opposite to the indicate surface 31. The indicate surface 31 has one or more identification marks 33, such as words, colors, numbers, patterns or figures. The glue surface 32 is stuck in the label region 26 of the tool main body 20. After being completely stuck, as shown in FIG. 3, the indicate surface 31 of the matte silver polyester label 30 is flush in elevation with the outer surface 25 of the handle portion 24, so that the matte silver polyester label 30 doesn't protrude out of the outer surface 25 of the handle portion 24 to affect the operational feel.

Figure 4:
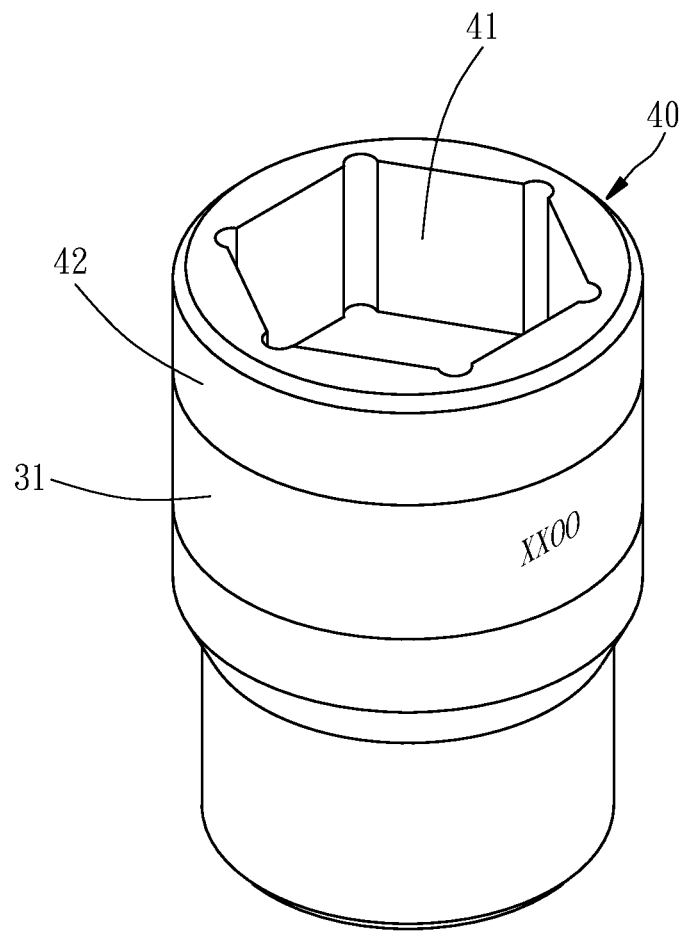
FIG. 4 is a perspective view of a tool of a second embodiment of the present invention.
Figure 5:
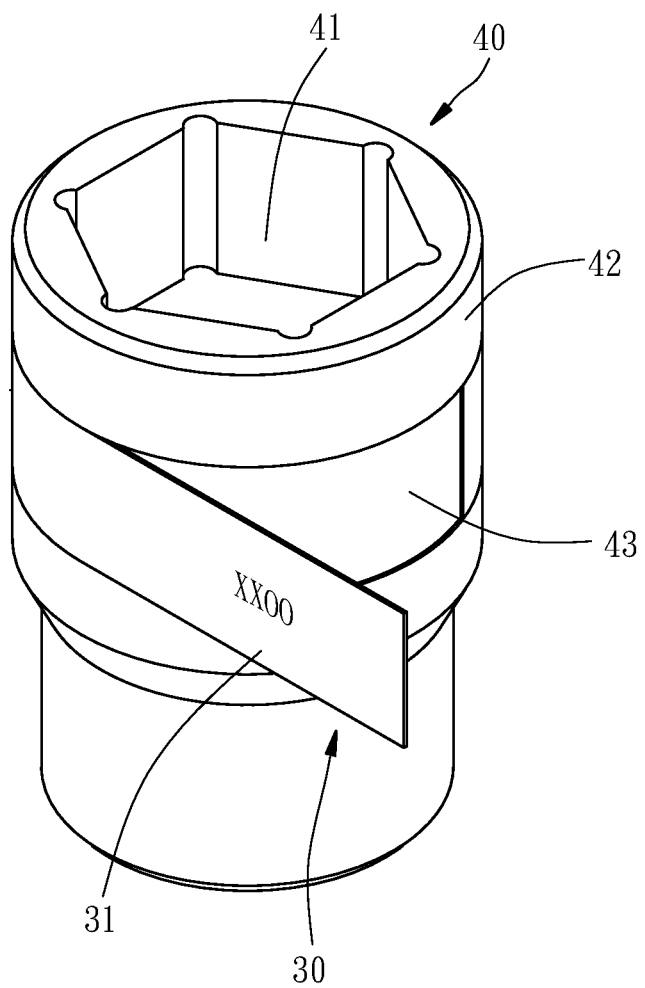
FIG. 5 is similar to FIG. 4, but primarily showing the condition that a matte silver polyester label is not completely stuck yet.

On the other hand, as shown in FIGS. 4 and 5, the tool main body 40 provided in a second embodiment of the present invention is a socket for example, which has a hexagonal socket hole 41. The label region 43 surrounds the outer surface 42 for a round with the socket hole 41 as the center, and the label region 43 is recessed from the outer surface 42 in the radial direction of the socket hole 41. Therefore, after the matte silver polyester label 30 is stuck in the label region 43, the indicate surface 31 of the matte silver polyester label 30 is flush in elevation with the outer surface 42 of the tool main body 40, so that the matte silver polyester label 30 is prevented from protruding out of the outer surface 42 to affect the operational feel.

In conclusion, the manufacturing process of the tool 10 of the present invention is very simple, and the label region 26 provides a large area for label. Besides, the matte silver polyester label 30 has features of waterproofing, grease proofing, scratch resistance, heat resistance and rip resistance, so it keeps great identification effect after a long-term use and it is not easy to come off, thereby attaining the objective of improved usage convenience.

What is claimed is:

1. A tool comprising:
   a tool main body, an outer surface of the tool main body having a label region; and
   a matte silver polyester label having an indicate surface and a glue surface opposite to the indicate surface, the indicate surface having an identification mark, the glue surface being stuck in the label region of the tool main body,
   wherein the tool main body is a wrench having a handle portion; the label region is provided on an outer surface of the handle portion,
   wherein an extending direction of the label region is parallel to a longitudinal direction of the handle portion,
   wherein the label region is recessed from the outer surface of the handle portion in a thickness direction of the handle portion, and
   wherein the indicate surface of the matte silver polyester label is flush in elevation with the outer surface of the handle portion.

2. A tool comprising:
   a tool main body, an outer surface of the tool main body having a label region; and
   a matte silver polyester label having an indicate surface and a glue surface opposite to the indicate surface, the indicate surface having an identification mark, the glue surface being stuck in the label region of the tool main body,
   wherein the tool main body is a wrench having a handle portion; the label region is provided on an outer surface of the handle portion,
   wherein the label region is recessed from the outer surface of the handle portion in a thickness direction of the handle portion, and
   wherein the indicate surface of the matte silver polyester label is flush in elevation with the outer surface of the handle portion.

3. The tool as claimed in claim 2, wherein an extending direction of the label region is parallel to a longitudinal direction of the handle portion.

4. A tool comprising:
   a tool main body, an outer surface of the tool main body having a label region; and
   a matte silver polyester label having an indicate surface and a glue surface opposite to the indicate surface, the indicate surface having an identification mark, the glue surface being stuck in the label region of the tool main body,
   wherein the tool main body is a socket having a socket hole,
   wherein the label region surrounds the socket hole of the tool main body with the socket hole as a center,
   wherein the label region is recessed from the outer surface of the tool main body in a radial direction of the socket hole, and
   wherein the indicate surface of the matte silver polyester label is flush in elevation with the outer surface of the tool main body.

\* \* \* \* \*